(12) United States Patent
Wadhwa et al.

(10) Patent No.: US 11,650,814 B1
(45) Date of Patent: May 16, 2023

(54) GENERATING CUSTOMIZED DOCUMENTATION FOR APPLICATIONS

(71) Applicant: EMC IP Holding Company LLC, Hopkinton, MA (US)

(72) Inventors: Vikas Wadhwa, Bangalore (IN); Jeroen Van Rotterdam, Berkeley, CA (US); Raman Walia, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 13/725,581

(22) Filed: Dec. 21, 2012

(51) Int. Cl.
*G06F 8/73* (2018.01)

(52) U.S. Cl.
CPC ................................ *G06F 8/73* (2013.01)

(58) Field of Classification Search
CPC ............. G06F 8/71; G06F 8/73; G06F 8/75
USPC .......................................................... 717/123
See application file for complete search history.

(56) References Cited

U.S. PATENT DOCUMENTS

| | | | | |
|---|---|---|---|---|
| 5,021,945 A | * | 6/1991 | Morrison | G06F 8/45 712/216 |
| 6,192,477 B1 | * | 2/2001 | Corthell | G06F 21/53 380/255 |
| 6,272,508 B1 | * | 8/2001 | Dyne | G06F 40/58 715/236 |
| 8,364,604 B1 | * | 1/2013 | Blatt et al. | 705/317 |
| 8,468,492 B1 | * | 6/2013 | Frenkel | 717/104 |
| 8,521,501 B2 | * | 8/2013 | Alam | G06F 11/3409 703/22 |
| 2002/0184065 A1 | * | 12/2002 | Menard | H04L 43/16 709/224 |
| 2006/0200749 A1 | * | 9/2006 | Shenfield | G06F 8/38 715/239 |
| 2006/0206864 A1 | * | 9/2006 | Shenfield | G06F 8/20 717/107 |
| 2006/0253495 A1 | * | 11/2006 | Png | G06F 17/30286 707/200 |
| 2008/0082829 A1 | * | 4/2008 | Yoshioka | H04N 1/32144 713/176 |
| 2008/0301766 A1 | * | 12/2008 | Makino | G06F 21/51 726/1 |
| 2009/0183066 A1 | * | 7/2009 | Crawford et al. | 715/231 |
| 2010/0088662 A1 | * | 4/2010 | Tung | G06Q 10/06 717/101 |
| 2012/0030554 A1 | * | 2/2012 | Toya | 715/206 |
| 2013/0138586 A1 | * | 5/2013 | Jung et al. | 706/12 |
| 2013/0152072 A1 | * | 6/2013 | Fernandez-Ruiz et al. | 717/175 |
| 2013/0326336 A1 | * | 12/2013 | Lanque | G06F 40/137 715/234 |

\* cited by examiner

*Primary Examiner* — Hang Pan
*Assistant Examiner* — Bradford F Wheaton
(74) *Attorney, Agent, or Firm* — Krishnendu Gupta; Nikhil Patel

(57) ABSTRACT

Generating customized documentation is disclosed, including: receiving a set of meta information describing an aspect of an application; and generating a document to provide guidance specific to the application based at least in part on at least a subset of the set of meta information.

1 Claim, 13 Drawing Sheets

Developer Tool User Interface

Create a Menu

| Menu attribute | Menu attribute value | Action attribute | Action attribute value |
|---|---|---|---|
| <Menu_title> | File | N/A | N/A |
| <Menu_item1> | New claim | <Action_attribute1> | Present.templates() |
| <Menu_item2> | Save | <Action_attribute2> | Save.file() |
| <Menu_item3> | Save us | <Action_attribute3> | Present.saveDialog() |
| <Menu_item4> | Print | <Action_attribute4> | Present.printOptions() |
| ⋮ | ⋮ | ⋮ | ⋮ |
| ⋮ | ⋮ | ⋮ | ⋮ |

Documentation for the File menu

900

File Menu

- Selection of "New claim" will result in a presentation of one or more claim application templates that may be used in creating the new claim application. A user may select one such template or no such template before selecting the "Create" button.

- Selection of "Save" will result in the current claim application being saved.

- Selection of "Save as" will result in a presentation of a save dialog window, in which a user may enter a name for the new claim application.

- Selection of "Print" will result in a presentation of one or more present options, including a dropdown menu for a selection of a printer to use.

Developer Tool User Interface

Search box appearance
Search facets

1100 →

Context attributes from the selected data sources

- ✔ Policyholder identity
- ✔ Claim filer identity
- ✔ Claim adjuster identity
- ✔ Vehicle insurance
- ☐ Home insurance
- ☐ Medical insurance
- ☐ Dental insurance
- ☐ Eye insurance

| Context attribute | Context attributes value | Context attributes from the selected data sources |
|---|---|---|
| <Policyholder_identity> | Policyholder name | Policyholder identity |
| <Claim_filer_identity> | Claimant name | Claim filer identity |
| <Claim_adjuster_identity> | Claim adjuster name | Claim adjuster identity |
| <Vehicle_insurance> | Car insurance | Vehicle insurance |
| <Home_insurance> | Home insurance 🖑 | |
| ⋮ | ⋮ | |
| ⋮ | ⋮ | |

FIG. 11

Search Topic Template

Search Box

- A search may be performed on the following sources: <source1>, <source2>, <source3>, and <source4>.

- After entering your search query in the displayed search box, select the "Submit" button to submit your query.

- Shortly after submitting your search query, you will be presented with a list of search results found from the selected search sources.

- To refine your search, select one or more of the following facets on the search results page:

<selected_context_attribute1>

<selected_context_attribute2>

<selected_context_attribute3>

<selected_context_attribute4>

<selected_context_attribute5>

Documentation for Search Topic

Search Box

1300

- A search may be performed on the following sources: Claims database, Policy database, and Quotes database.

- After entering your search query in the displayed search box, select the "Submit" button to submit your query.

- Shortly after submitting your search query, you will be presented with a list of search results found from the selected search sources.

- To refine your search, select one or more of the following facets on the search results page:

"Policyholder name"

"Claimant name"

"Claim adjuster name"

"Car insurance"

"Home insurance"

GENERATING CUSTOMIZED DOCUMENTATION FOR APPLICATIONS

BACKGROUND OF THE INVENTION

In some existing systems, a user may use a developer tool to design an enterprise application. However, documentation describing the application and/or how to use it would often need to be manually generated, which could be cumbersome and time consuming. Sometimes, manually generating the documentation for a specific application may include cross-referencing relevant portions of multiple existing documents, which may not be sufficient to create a complete documentation of a customized application.

BRIEF DESCRIPTION OF THE DRAWINGS

Various embodiments of the invention are disclosed in the following detailed description and the accompanying drawings.

FIG. 7 is a diagram showing an example of a user interface associated with a developer tool used to define applications.

FIG. 9 is an example of a portion of documentation generated for an application.

FIG. 11 is a diagram showing an example of a user interface associated with a developer tool used to define applications.

FIG. 12 is an example of a template to be used with meta information associated with an application in generating documentation for the application.

FIG. 13 is an example of a portion of documentation generated for an application.

DETAILED DESCRIPTION

Figure 1:
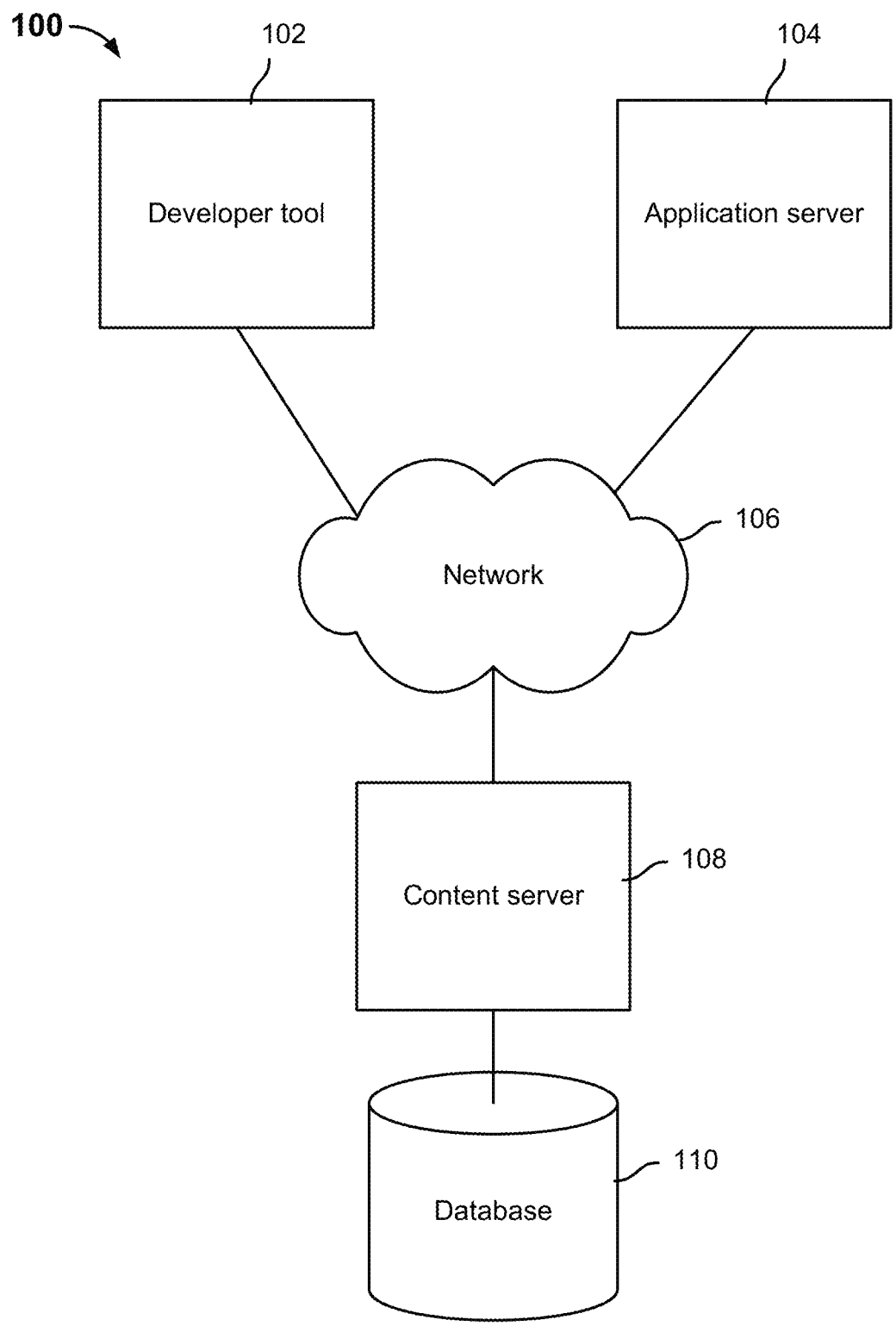
FIG. 1 is a diagram showing an embodiment of a system to generate documentation specific to an application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to automatically generate documentation specific to an application are disclosed. In some embodiments, an application (e.g., developed by a user associated with an enterprise) is defined, built, and deployed. The application may be defined using a developer tool that is configured to provide a user with predefined patterns, components, services, for example, that the user may use to define the application and/or the deployment thereof. Meta information associated with at least an aspect of the application is generated. For example, an aspect of the application may pertain to the definition of the application and another aspect of the application may pertain to the deployment of the application. The meta information may include Extensible Markup Language (XML) or other information that represents and/or reflects one or both of a structure and content elements of the application. The meta information may be used in some embodiments to automatically generate a set of Darwin Information Typing Architecture (DITA) topics that describe or otherwise document one or more aspects of the application. In some embodiments, a subset of the meta information associated with one or more aspects of the application is transformed into documentation that is specific to the application. For example, the documentation may comprise a human-readable document (e.g., in various formats such as PDF, Word Document, or HTML) that may serve as a guide to the application. Some examples of the documentation may include an employee induction guide, a user guide, a procedure guide, and a troubleshooting guide.

FIG. 1 is a diagram showing an embodiment of a system to generate documentation specific to an application. Developer tool 102, application server 104, and content server 108 may be local or remote to each other. Developer tool 102, application server 104, and content server 108 may communicate to each other over network 106. Network 106 includes high-speed data networks and/or telecommunications networks.

Developer tool 102 is configured to enable a developer user (e.g., associated with an enterprise) to create an enterprise application. Examples of an enterprise application include an insurance claim processing application, a loan application processing application, and a credit dispute resolution application. Portions of an enterprise application may be used by users internal to the enterprise (e.g., employees of the enterprise) and portions of the enterprise application may be used by users external to the enterprise (e.g., customers of the enterprise). For example, a customer of an insurance company may use the insurance claim processing application to submit a new claim and then an employee (e.g., customer representative or claims adjuster) of the insurance company may use the application to review the content of the claim against the policy taken out by the customer. In some embodiments, developer tool 102 comprises a graphical tool with a user interface that enables a user (e.g., a developer associated with an enterprise) to compose/define an application using predefined patterns, components, services, templates, libraries, and rules, for example. A definition of an application may include selections of predefined content, defined relationships between different components, values submitted to correspond to selected attributes, a user interface, a form, a menu, an integration to a third party service, a login page, and a search feature, for example. In some embodiments, at least some of the predefined content associated with developer tool 102 is associated with existing documentation. In some embodiments, the graphical tool of developer tool 102 may allow a user to drag and drop predefined content at the user interface to enable a user with little to no computer programming experience to define an application. An example of the graphical tool is the EMC Documentum xCP software.

Developer tool 102 is configured to generate a set of meta information that describes a definition (e.g., structural description) of an application. In some embodiments, the meta information associated with the definition of an application may describe the structure of the application such as, for example, which predefined content is used, which values corresponding to which attributes, and/or which repositories are to be contacted. In some embodiments, the meta information associated with the definition of the application may include XML files. In some embodiments, the meta information may include portions of existing documentation produced for certain predefined content of the application. For example, a piece of predefined content may have been generated by a third party who also produced accompanying documentation for the piece of content. Therefore, such accompanying documentation may be stored with the piece of predefined content. In some embodiments, the meta information associated with the definition of the application is sent to and stored by application server 104.

Developer tool 102 is configured to build a defined application. In some embodiments, developer tool 102 builds a defined application by transforming the definition of the application into a set of computer code that may be executed in order to deploy the application. In some embodiments, the deployment of an application includes running the application on a device such as a server. For example, a user may remotely access a deployed application to fetch any desired information from the application. In some embodiments, the meta information associated with the deployment of the application may include XML files. For example, the meta information associated with the deployment of the application may include EMC xCelerated Management System (xMS) Blueprints. In some embodiments, developer tool 102 may deploy the application at a local device and/or at a remote data center (e.g., at a cloud). For example, the data center (e.g., cloud) may be managed by the enterprise associated with the application or by a third party. In some embodiments, developer tool 102 is configured to generate meta information associated with the deployment of the application. For example, the meta information associated with the deployment of the application may indicate which devices are used in the deployment, where the devices are geographically located, which devices are configured, which third party services may be connected to the application. In some embodiments, the meta information associated with the deployment of the application may be modified by a user to adjust the default deployment that was generated by developer tool 102. In some embodiments, the deployment of the application is determined independently from its definition. In some embodiments, an application built by developer tool 102 may be sent to and deployed at application server 104.

Application server 104 is configured to run the application received from developer tool 102. In some embodiments, application server 104 is configured to store meta information associated with at least one aspect of the application. Examples of aspects associated with the application include the definition of the application and the deployment of the application. In some embodiments, application server 104 is configured to use at least a subset of the meta information associated with the application to generate a set of customized documentation for the application. For example, the documentation may be generated based on the meta information describing the definition of the application input by a user using the graphical tool of developer tool 102 and/or the meta information describing the deployment of the application generated by developer tool 102 and/or determined by a user. In some embodiments, templates for the documentation are used in generating the documentation so that the relevant portions of the meta information may be mapped to the appropriate locations of the documentation to create a human-readable document that, for example, instructs a reader on how to use and/or understand the definition of that specific application and/or the deployment thereof. In some embodiments, developer tool 102 is configured to generate the documentation specific to an application alternatively or in addition to application server 104 doing so. In some embodiments, the generated documentation specific to an application may be updated in response to a change to an aspect of the application. For example, if the definition of the application changed and/or the deployment of the application were modified, then the relevant portions of the documentation would be appropriately updated. In some embodiments, a generated documentation may be modifiable by a user.

Because the documentation of the application may be automatically generated based on at least some meta information that describes the construction the application and/or the deployment of the application, the documentation is specifically tailored to the needs of the users of the application. Furthermore, because changing the application causes a rapid update to the affected portions of the documentation, the documentation may be kept update-to-date without cumbersome manual documentation/updating.

In some embodiments, application server 104 stores and accesses content related to the application at repository 110. In some embodiments, application server 104 communicates with content server 108 to store and/or access content at repository 110. In some embodiments, content server 108 comprises a content management system for the content stored at repository 110. In some embodiments, an application running at application server 104 makes calls to business logic software objects stored at application server 104, which instantiate and access runtime implementation objects on application server 104 and/or access persistently stored implementation objects stored by repository 110 and managed by content server 108, as applicable, to perform desired content management operations. For example, customized documentation generated for applications associated with application server 104 may be stored at repository 110.

Figure 2:
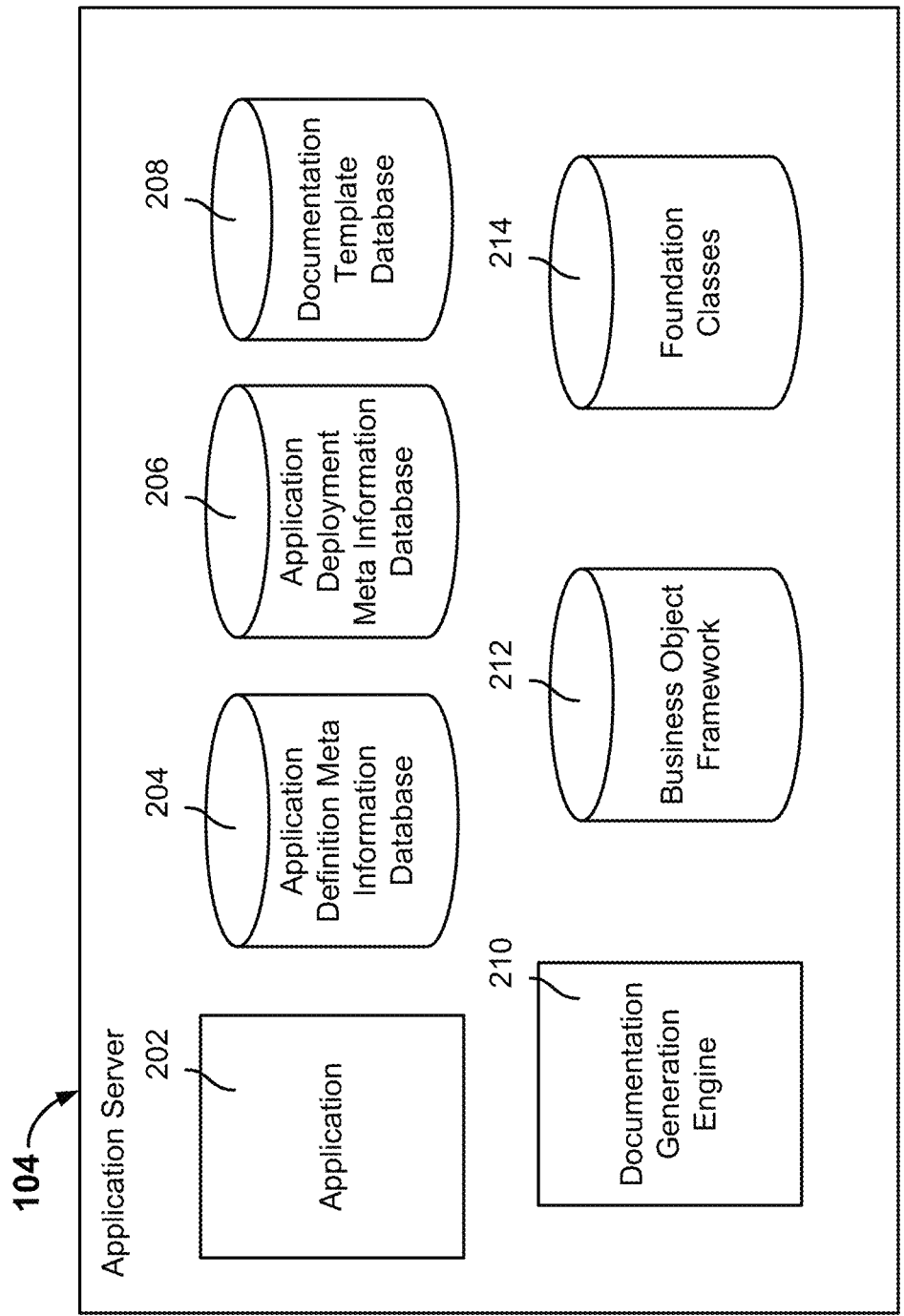
FIG. 2 is a diagram showing an embodiment of an application server.

FIG. 2 is a diagram showing an embodiment of an application server. In some embodiments, application server 104 of system 100 of FIG. 1 may be implemented using the example of FIG. 2. The example application server includes application 202, application definition meta information database 204, application deployment meta information database 206, documentation template database 208, documentation generation engine 210, business object framework 212, and foundation classes 214. Each of application definition meta information database 204, application deployment meta information database 206, documentation template database 208, business object framework 212, and foundation classes 214 may be implemented using one or more databases. Each of application 202 and documentation generation engine 210 may be implemented using hardware and/or software.

Application 202 is configured to perform one or more enterprise processes. In some embodiments, application 202 is configured to include a user interface that a user may use to perform an operation with application 202. In some embodiments, application 202 is defined by a user using a developer tool such as developer tool 102 of system 100 of FIG. 1. Meta information generated to include the definition of the application (and the definition of one or more other applications) is stored at application definition meta information database 204. In some embodiments, the deployment of application 202 is determined at least in part by developer tool such as developer tool 102 of system 100 of FIG. 1. Meta information generated based on the deployment of the application (and the deployment of one or more other applications) is stored at application deployment meta information database 206. In some embodiments, the functionalities of application 202 and/or the manner in which application 202 is deployed may be modified by a user over time. A change to application 202 may cause an update to be performed on at least portions of the meta information pertaining to the definition and/or deployment of the application stored respectively at application definition meta information database 204 and application deployment meta information database 206.

In some embodiments, application 202 is configured to store files and/or other data (e.g., generated customized documentation) at a remote repository. In some embodiments, application 202 is configured to make calls to business logic software objects stored at business object framework 212 and/or foundation classes 214, which instantiate and access runtime implementation objects on the application server and/or access persistently stored implementation objects stored by a remote repository and managed by a content server, as applicable, to perform desired content management operations.

Application definition meta information database 204 is configured to store sets of meta information pertaining to the definitions of one or more applications, such as application 202, for example. In some embodiments, the set of meta information associated with the definition of application 202 is generated and received from a developer tool such as developer tool 102 of system 100 of FIG. 1. In some embodiments, the set of meta information associated with the definition of application 202 includes XML files. For example, at least some of such XML files may be based on the DITA format. DITA content comprises an XML data model used for authoring and publishing. DITA content may comprise a container file that includes a set of topics, where each such topic comprises an individual XML file. For example, each topic may cover a specific subject. DITA topics may be further categorized as: concepts (e.g., topics that include conceptual information), and procedures (e.g., topics that describe a task), reference (e.g., topics that describe a syntax). The DITA content associated with an application may also include a DITA map that is a container including a table of content that defines relationships between the respective DITA topics in the set topics and is used to transform a collection of content into a publication. In some embodiments, a DITA map and/or a set of DITA topics to use to generate the documentation are selected from meta information associated with the definition. In some embodiments, the set of meta information associated with an application may be generated based on the predefined content (e.g., patterns, templates, services, components) and relationships between such predefined content that was configured by a user in defining the application. For example, because the developer tool had awareness of the definition of the content that were usable by the user and the way the content was related to one another (e.g., either as predefined or defined by the user), the generated meta information associated with the definition of the application can capture the structure of the application (as well as any existing documentation that accompany such predefined content). Furthermore, because the same predefined content of the developer tool may be used in different applications, the definition and also, sometimes, some of the same documentation of such predefined content, may be reused in the meta information and also, in the customized documentations generated for different applications.

Application deployment meta information database 206 is configured to store sets of meta information pertaining to the deployments of one or more applications, such as application 202, for example. In some embodiments, the set of meta information associated with the deployment of application 202 is generated and received from a developer tool such as developer tool 102 of system 100 of FIG. 1. In some embodiments, the set of meta information associated with the deployment of application 202 includes XML files. For example, at least some of such XML files may be based on the DITA format. For example, the meta information associated with the deployment of application 202 may comprise an EMC xMS Blueprint. For example, the meta information for the deployment of an application may describe the components included in the deployment such as a business monitoring tool, a search tool, APPHOST, and a document transformation tool. Because the developer tool had awareness of the components/devices that are available to the deployment of the application, how such components/devices are configured, where the components/devices are geographically located, and/or which users correspond to one or more roles associated with the deployment, the generated meta information associated with the deployment of the application can capture the current manner in which the application is deployed (as well as any existing documentation that accompany such deployment configuration). Furthermore, because a similar deployment of an application determined by a developer tool may be used in different applications, the deployment configuration and also, sometimes, some of the same documentation of such deployment configured, may be reused in the meta information and also, in the customized documentations, generated for different applications.

In some embodiments, elements of the XML files in the meta information associated with a specific application may be tagged and/or arranged as DITA topics automatically by the developer tool and/or based on another automated process. In some embodiments, the xMS agent associated with the developer tool provides the tagging related to the deployment of the application. The xMS agent (e.g., a process) is aware of all the hardware servers (e.g., that comprise a cloud) on which the application is deployed and the tags in the meta information describing the deployment are updated with the information sent from the xMS agent. For example, customized computer code used for tagging XML elements may be tailored for each particular enterprise industry so that the meta information associated with an application for the insurance industry may be treated differently than an application for the banking industry. In some embodiments, the DITA map and/or at least some of the DITA topics are selected to be included in a set of DITA content to be used to generate the documentation for the application.

Documentation template database 208 is configured to store templates to be used to generate customized documentation for applications from the associated meta information. In some embodiments, documentation template database 208 stores at least one template for a topic that may be encountered in the meta information associated with an application. In some embodiments, at least some of the templates stored at documentation template database 208 are generated by technical writers. In some embodiments, at least some of the templates stored at documentation template database 208 are reusable for different types of applications. In some embodiments, a template stored at documentation template database 208 is configured to be used to map certain values, attributes, patterns, and/or services used in an application, such as application 202, to related human-readable instructions to be included in the generated documentation for that application. In some embodiments, a template is also stored with custom logic and/or code that recognizes the relevant elements (e.g., based on one or more tags associated with each element) of the XML files included in the meta information describing an aspect of an application and how to handle them. For example, a template may include data and/or associated with custom logic and/or code that determine whether for a certain application attribute included in the XML files, to display the attribute's value or to display the attribute's value and other existing documentation or text that is accompanies the attribute's value. In another example, a template may include data and/or associated with custom logic and/or code that determine the visual appearances (e.g., font, formatting) of different portions of some of the generated documentation.

Documentation generation engine 210 is configured to generate documentation customized for an application, such as application 202, based on at least a subset of the meta information generated for the application. In some embodiments, documentation generation engine 210 is configured to use at least a subset of the meta information describing one or more aspects of the application to generate a human-readable document/publication in a one or more formats. Examples of aspects of the application include the definition of the application and the deployment of the application. The documentation may be an employee induction guide, a user guide, a procedure guide, and a troubleshooting guide, for example. For example, each set of documentation may include a table of contents and chapter/sections that each describes a subject regarding the application. The documentation may be generated into formats such as Word document, PDF, and (e.g., HTML) webpage that may either be printed out and/or viewed on an electronic device.

In some embodiments, a set of DITA topics may be selected based on the meta information associated with the application. In some embodiments, documentation generation engine 210 is configured to select at least a subset of the set of the DITA topics that is relevant to one or more selected aspects of the application. In some embodiments, the meta information includes data that indicates which topics are relevant to a documentation of the application. In some embodiments, documentation generation engine 210 is configured to create a DITA map that defines the relationships between respective topics of the selected DITA topics. In some embodiments, a DITA map for the selected DITA topics may be manually created. Then documentation generation engine 210 is configured to generate a set of documentation using the DITA map, selected DITA topics, and standard DITA publishing techniques. In some embodiments, documentation generation engine 210 is configured to use one or more templates (e.g., corresponding to at least some of the selected DITA topics) from documentation template database 208 in generating the documentation. In some embodiments, the generated documentation may be sent to a user, published at a webpage, and/or printed out. In some embodiments, in response to a change to the application, documentation generation engine 210 is configured to update at least the portion the set of documentation generated for application that is affected by the change.

Figure 3:
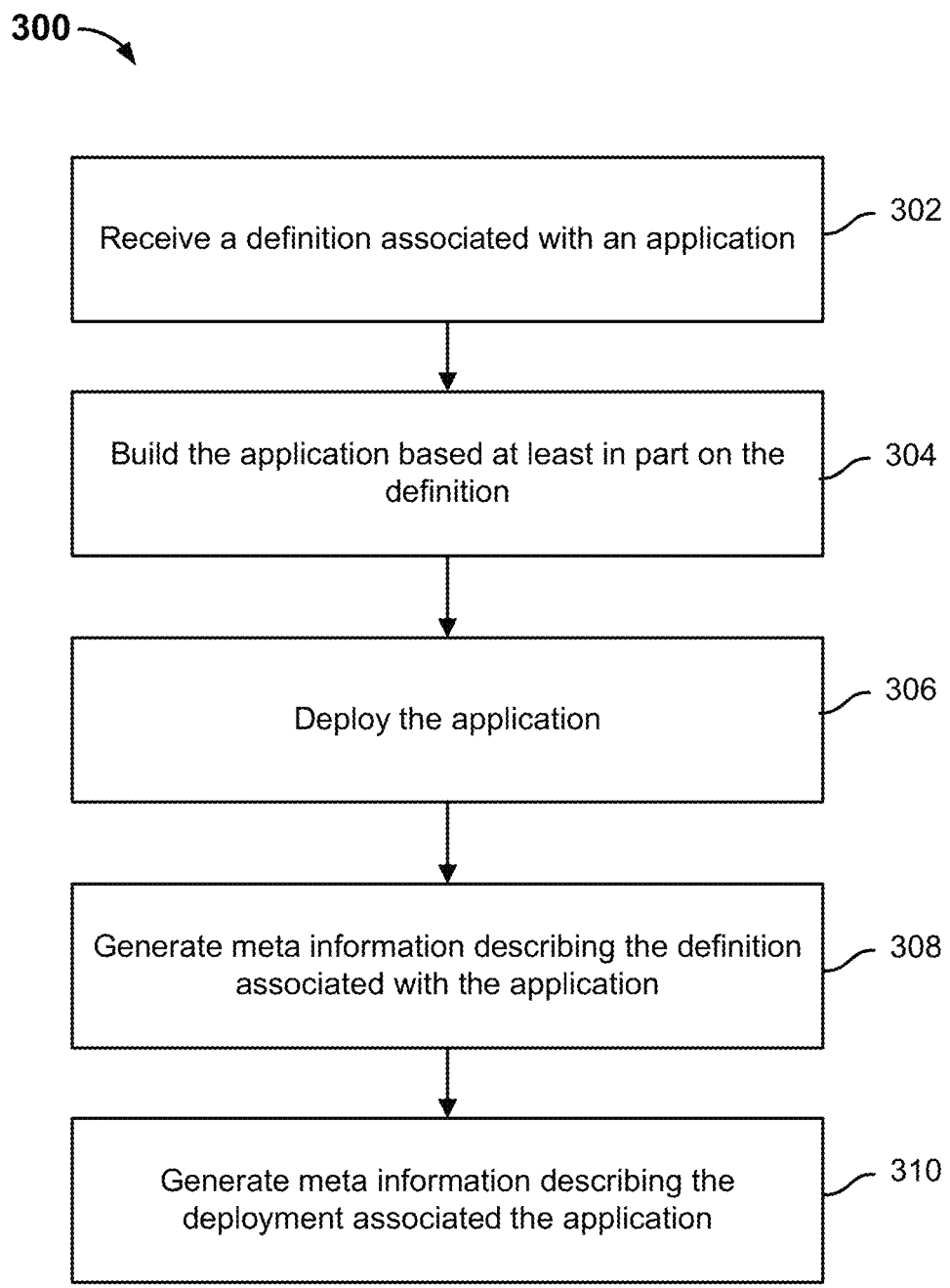
FIG. 3 is a flow diagram showing an embodiment of a process for creating an application.

FIG. 3 is a flow diagram showing an embodiment of a process for creating an application. In some embodiments, process 300 is implemented at system 100 of FIG. 1.

At 302, a definition associated with an application is received. In some embodiments, the application comprises an enterprise application. In some embodiments, the application may be defined using a developer tool in which a user may select among predefined content (e.g., patterns and components) and create relationships between selected pieces of predefined content to define an application.

At 304, the application is built based at least in part on the definition. In some embodiments, the definition of the application is transformed into computer code that may be executed to deploy the application. In some embodiments, the application is built using EMC Documentum Process Builder.

At 306, the application is deployed. In some embodiments, the application is deployed at a data center and/or across one or more devices. In some embodiments, during deployment, the application is connected with one or more external services (e.g., search engines, repositories).

At 308, meta information associated with the definition describing the application is generated. In some embodiments, meta information describing the definition of the application is generated by transforming the definition of the application into a set of XML files (if the original format of the definition was not already in XML format). In some embodiments, the XML files are in the DITA standard and include topics associated with various components included in the application. In some embodiments, the elements and/or DITA topics of the XML files are tagged (e.g., either manually or automatically by the developer tool) such that a DITA publishing technique (e.g., in combination with custom code/logic) may understand how to process at least a portion of the XML files into the documentation for the application.

At 310, meta information associated with the deployment describing the application is generated. In some embodiments, meta information describing the deployment of the application is generated by transforming the deployment configuration of the application into a set of XML files (if the original format of the configuration was not already in XML format). In some embodiments, the XML files are in the DITA standard and include topics associated with various components included in the application. In some embodiments, the elements and/or DITA topics of the XML files are tagged such that a DITA publishing technique (e.g., in combination with custom code/logic) may understand how to process at least a portion of the XML files into the documentation for the application.

Figure 4:
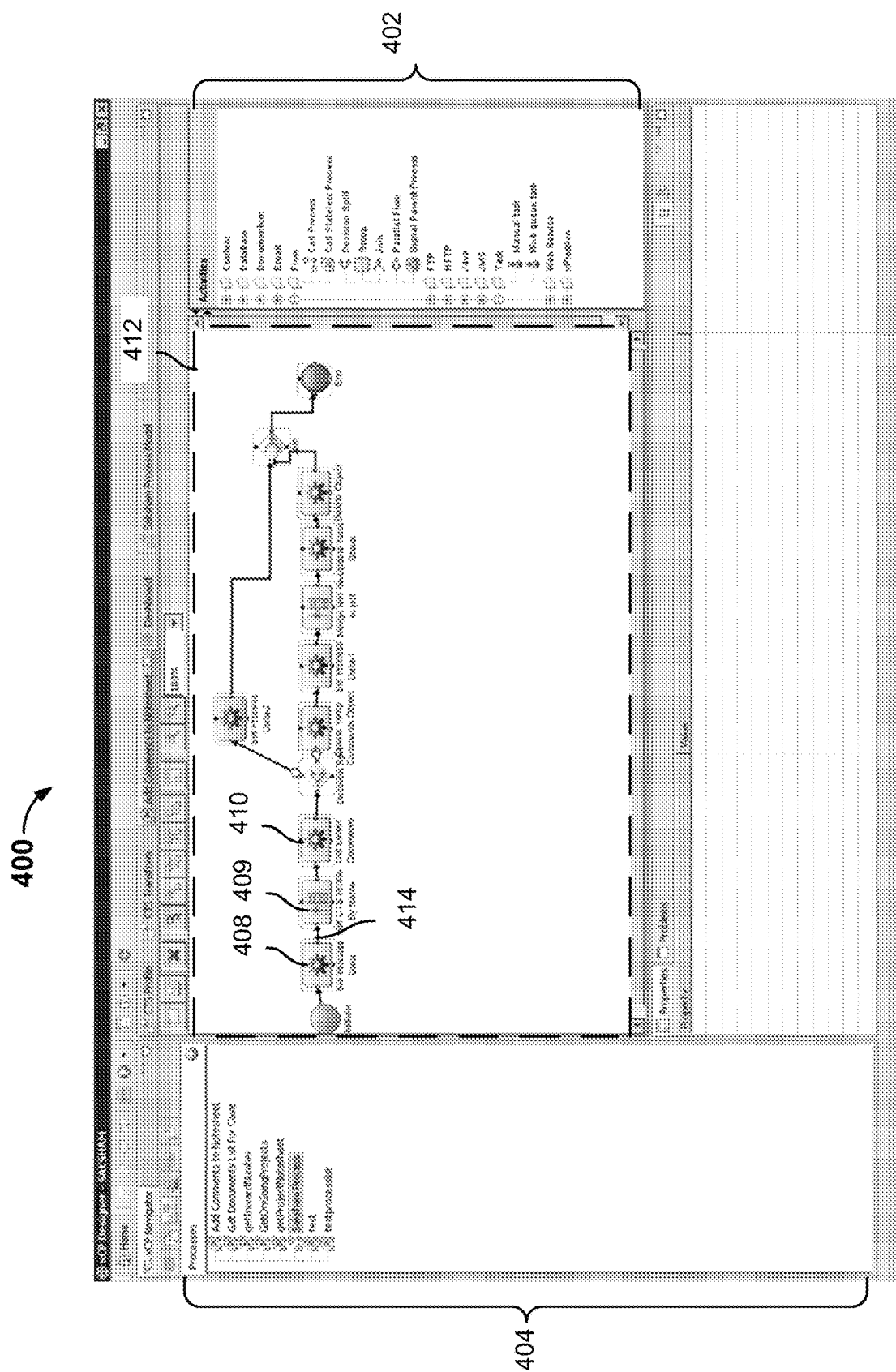
FIG. 4 is an example of a user interface associated with a developer tool used to create applications.

FIG. 4 is an example of a user interface associated with a developer tool used to create applications. For example, user interface 400 may be associated with a developer tool such as developer tool 102 of system 100 of FIG. 1. In the example, user interface 400 includes predefined content that a user may select to include into an application. For example, section 402 includes at least a portion of the library of Activities. Each of such activities (e.g., Call Process and Call Stateless Process for example, under the Flow folder) is displayed with an icon. Also, for example, section 404 includes at least a portion of the library of Processes. Each of such processes (e.g., Add comments to Notesheet, Get Documents List for Case, for example) is displayed with an icon. In the event that a user wanted to include a particular activity or a particular process into the application, in some embodiments, the user can drag the icon and/or text associated with the activity or process into an area such as area 412. Area 412 shows various pieces of predefined components that have been selected by a user and some of which are related to each other based on user selections. For example, pieces of predefined components in the area include components 408, 409, and 410 that were each selected from one or more libraries of predefined contents, such as Activities of section 402 and Processes of section 404. Relationships between the components such as relationship connector 414 may be added by a user to indicate a connection/sequence of actions to occur in this particular business process. In some embodiments, the meta information describing the definition of the application of which a portion is illustrated in this example would include at least the definitions of components such as components 408, 409, and 410 and the relationships between the components such as relationship connector 414.

Figure 5:
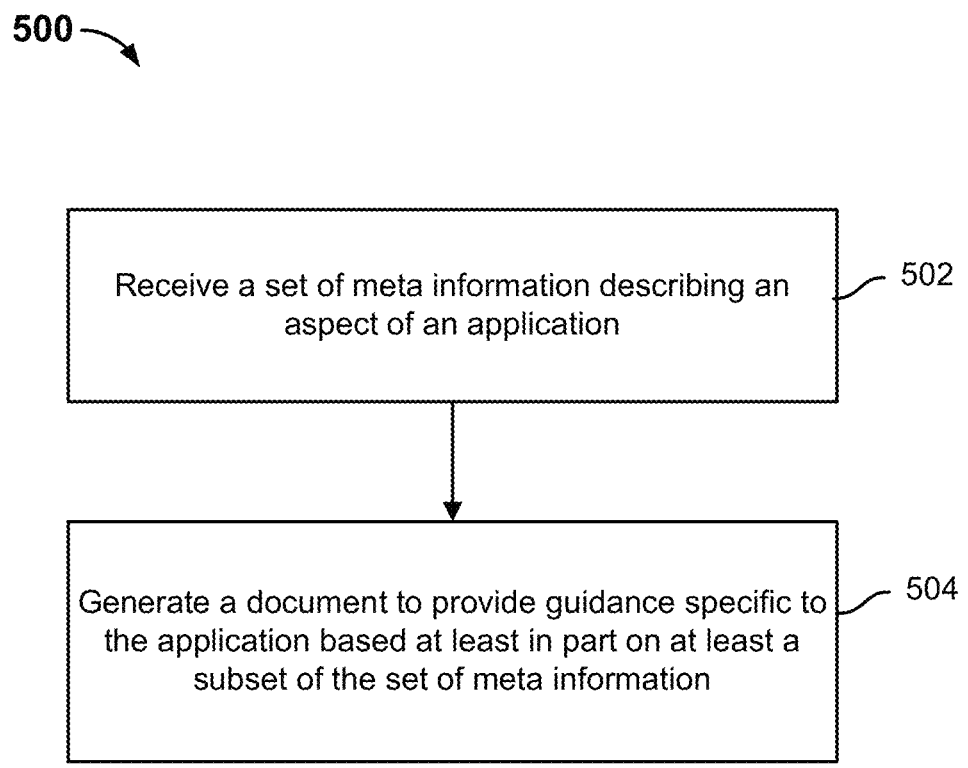
FIG. 5 is a flow diagram showing an embodiment of a process for generating customized documentation for an application.

FIG. 5 is a flow diagram showing an embodiment of a process for generating customized documentation for an application. In some embodiments, process 500 is implemented at system 100 of FIG. 1.

At 502, a set of meta information describing an aspect of an application is received. Examples of an aspect of the application include the definition of the application and the deployment of the application. In some embodiments, the set of meta information is generated by a developer tool associated with creating the application or generated based on data associated with the definition/deployment of the application generated by the developer tool. In some embodiments, the set of meta information may include a set of XML files.

At 504, a document to provide guidance specific to the application is generated based at least in part on at least a subset of the set of meta information. In some embodiments, documentation that is a human-readable document such as a user guide, for example, is created to instruct a user how to use the specific application. For example, the documentation may be populated with descriptions of the components configured by the developer user of the application and also the attribute values submitted by the developer. Because the documentation is created specifically for each application, the documentation generated for two different applications may be different. Users of the application may benefit from easily being able to locate the content that they want from the documentation because of documentation's nature of being tailored for that application. In some embodiments, the documentation is generated based at least in part on templates that reference at least some content included in the meta information associated with the application and/or that include written instructions to accompany the referenced content.

Figure 6:
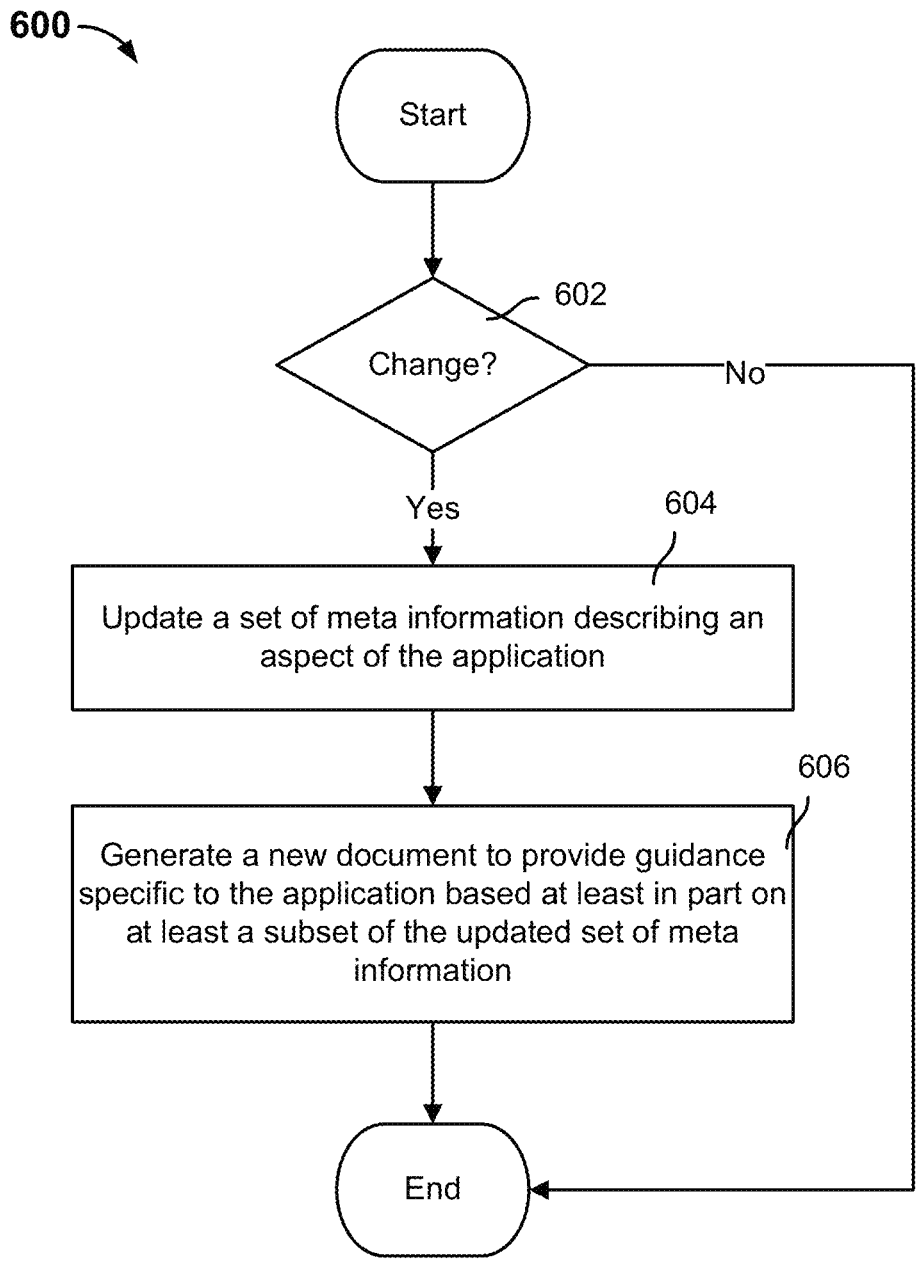
FIG. 6 is a flow diagram showing an embodiment of a process for updating customized documentation.

FIG. 6 is a flow diagram showing an embodiment of a process for updating customized documentation. In some embodiments, process 600 is implemented at system 100 of FIG. 1.

At 602, it is determined whether a change with respect to an application has occurred. In some embodiments, after the application is created, the application may be changed (e.g., by a user or an automated process such as a change being made to the developer tool used to create the application). For example, the change may occur with respect to the definition of the application (e.g., one or more components of the applications are added or a relationship between two components is changed) or to the deployment of the application (e.g., a device configured to deploy the application fails and so the deployment is migrated to a new device). In the event that it is determined that a change has occurred, control passes to 604. Otherwise, the process ends.

At 604, a set of meta information describing an aspect of the application is updated. In response to the determined change to the application, the portion(s) of the meta information associated with the change to the application are updated to accommodate the change.

At 606, a new document to provide guidance specific to the application is generated based at least in part on at least a subset of the updated set of meta information. In response to the update to the meta information on which the previously generated documentation for the application was based, a new set of documentation is generated based on the updated meta information. In some embodiments, a copy of the previously generated documentation may be used and only the portions of the documentation that are affected by the change to the application are updated to create the new documentation.

Figure 8:
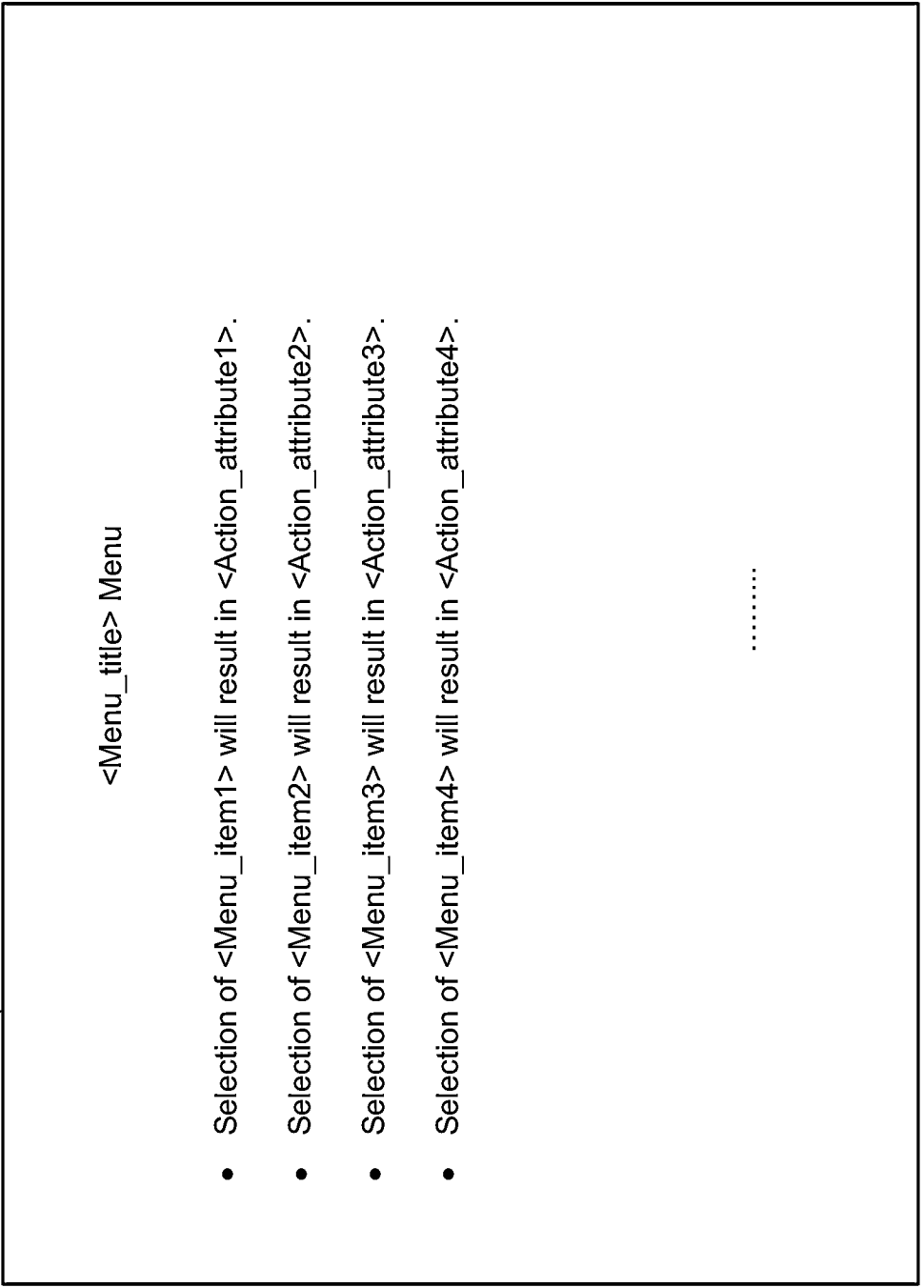
FIG. 8 is an example of a template to be used with meta information associated with an application in generating documentation for the application.

FIGS. 7, 8, and 9 illustrate an example of generating documentation for a File menu of an application.

FIG. 7 is a diagram showing an example of a user interface associated with a developer tool used to define applications. The example of FIG. 7 describes an example of a definition for the File menu for an application that is intended for the use of an insurance claimant to file an insurance claim. For example, the enterprise associated with the application may be an insurance company. In the example, developer tool user interface 700 shows a user interface used to define a File menu for an application. To arrive at user interface 700, a user, who is a developer, may have previously selected a menu creation selection. User interface 700 includes an area under the "Create a Menu" tab that shows a table in which the developer may input values for menu related names and relationships between menu items and actions in response to user selection of each menu item during deployment. In the example, the leftmost column titled "Menu attribute" includes various attributes associated with a menu feature. In some embodiments, each the attributes (e.g., <Menu_title>, <Menu_item1>, <Menu_item2>, and so forth) is selected (e.g., by the developer) from a list of enumerated menu attributes. The second from the left column titled "Menu attribute value" includes the menu items' corresponding values that are input into each row by the developer. In some embodiments, how the menu attribute values will be displayed for the respective menu item attributes in the deployed application and how the menu attribute values will be described in the documentation for the application may be indicated (e.g., using tags) in the meta information associated with the application and/or indicated in a template, if one is used, for generating the documentation. For example, where the <Menu_title> attribute is to be used in the application, "File" will be displayed and where <Menu_title> is to be included in the documentation, "File" will also be displayed. Also, where the <Menu_item1> attribute is to be used in the application, "New claim" will be displayed and where <Menu_item1> is to be included in the documentation, "New claim" will also be displayed.

The third from the left column titled "Action attribute" includes action attributes that correspond to the menu attributes and menu attribute values. In some embodiments, each the attributes (e.g., <Action_attribute1>, <Action_attribute2>, <Action_attribute3>, and so forth) is selected (e.g., by the developer) from a list of enumerated action attributes. Because <Menu_title> has no corresponding action attribute, "N/A" appears within the corresponding location of the fourth from the left column titled "Action attribute value". In some embodiments, how the action attribute values will be used for the respective menu item attributes in the deployed application and how the action attribute values will be described in the documentation for the application may be indicated (e.g., using tags) in the meta information associated with the application and/or indicated in a template, if one is used, for generating the documentation. For example, when the "New claim" menu item is selected by a user using the deployed application, such as an insurance claimant, the process "Present.templates( )" associated with <Action_attribute1> is to be called. For example, "Present.templates( )" displays one or more claim application templates that the claimant may use in creating her claim. The documentation for the application will include a description that if a user selects the "New claim" menu item in the File menu, then the actions associated with "Present.templates( )" are to occur (e.g., the display the one or more claim application templates). In another example, when the "Save" menu item is selected by a user using the deployed application, such as an insurance claimant, the process "Save.file( )" associated with <Action_attribute2> is to be called. For example, "Save.file( )" the current claim file that is open. The documentation for the application will include a description that if a user selects the "Save" menu item in the File menu, then the actions associated with "Save.file( )" are to occur (e.g., the current claim file will be saved).

FIG. 8 is an example of a template to be used with meta information associated with an application in generating documentation for the application. The example of FIG. 8 describes an example of a menu topic template that may be used with the File menu defined in FIG. 7. In some embodiments, the meta information describing the definition of the File menu defined in FIG. 7 includes XML files from which one or more DITA topics may be selected. In the example, the definition of the File menu of FIG. 7 is associated with a DITA topic that is associated with the subject of menu. In generating documentation for the application, the meta information describing the definition of the File menu item defined in FIG. 7 may be parsed and the DITA topic associated with the File menu may be extracted. Then, a transformation process or publishing mechanism (e.g., associated with documentation generation engine 210 of FIG. 2) may use menu topic template 800 of FIG. 8 to transform the DITA topic associated with the definition of the File menu of FIG. 7 into documentation for how to use the File menu. Menu topic template 800 includes content that will be displayed as is in the resulting documentation. For example, the text of "Selection of" and "will result in" may appear as is in the resulting documentation. Menu topic template 800 also includes content that references elements of the definition of the File menu of FIG. 7 described by the associated meta information. For example, "<Menu_title>", "<Menu_item1>", "<Action_attribute1>", "<Menu_item2>", and "<Action_attribute2>", and so forth, reference the elements of the definition of the File menu of FIG. 7. For example, references to elements of the definition may be treated differently in the resulting documentation based on one or more of the following: a tag that may be associated with the element in the definition, logic/computer code associated with the template that has awareness of the different manners in which different types of elements are to be handled, and logic/computer code associated with generation of the documentation (e.g., documentation generation engine 210 of FIG. 2) that has awareness of the different manners in which different types of elements are to be handled. For example, for an attribute such as "<Menu_title>", its corresponding menu attribute value, "File", may directly be displayed in the documentation where "<Menu_item1>" is found the template. For example, for an attribute such as "<Menu_item1>", its corresponding menu attribute value, "New claim", may directly be displayed in the documentation where "<Menu_item1>" is found the template. Similarly, for an attribute such as "<Menu_item2>", its corresponding menu attribute value, "Save", may be directly displayed in the documentation where "<Menu_item2>" is found the template. However, an attribute such as "<Action_attribute1>" may be treated differently in the resulting documentation than attributes such as "<Menu_item1>" and "<Menu_item2>". For example, for an attribute such as "<Action_attribute1>", its corresponding menu attribute value which calls a process, "Present.template( )", may not be directly displayed in the documentation where "<Action_attribute1>" is found the template. Rather, a piece of existing documentation (e.g., associated with menu topic template 800 or included in the definition of the File menu of FIG. 7) associated with its corresponding action attribute value "Present.template( )" may be displayed in the documentation instead. Similarly, for an attribute such as "<Action_attribute2>", its corresponding menu attribute value a process, "Save.file( )", may not be directly displayed in the documentation where "<Action_attribute2>" is found the template. Rather, a piece of existing documentation (e.g., associated with menu topic template 800 or included in the definition of the File menu of FIG. 7) associated with its corresponding action attribute value "Save.file( )" may be displayed in the documentation instead.

FIG. 9 is an example of a portion of documentation generated for an application. The example of FIG. 9 describes an example of the portion of documentation generated for the File menu defined in FIG. 7 for an application. In the example, documentation 900 is generated using the meta information describing the definition of the File menu of FIG. 7 and the menu topic template 800 of FIG. 8. Documentation 900 comprises a human-readable document and may be displayed in any of various formats, such as, a Word Document, and a PDF, a (e.g., HTML) webpage, for example. Documentation 900 (along with other documentation) may be sent to potential insurance claimants that are customers of the insurance company associated with the application to guide them on how to use application to file a claim. Documentation 900 specifically provides guidance for using the File menu associated with the application.

Documentation 900 includes values populated from the File menu definition of FIG. 7 (e.g., these values includes "File," "New claim," "File," "Save as," and "Print") and text from menu topic template 800 of FIG. 8 (e.g., this type of text includes "selection of" and "will result in"). Documentation 900 also includes text associated with certain attributes of the File menu definition (e.g., these attributes include "<Action_attribute1>", "<Action_attribute2>", "<Action_attribute3>", and "<Action_attribute4>"). For example, the text associated with "<Action_attribute1>" may be specifically associated with its corresponding value of call to process "Present.templates( )" and includes "a presentation of one or more claim application templates that may be used in creating the new claim application. A user may select one such template or no such template before selecting the 'Create' button." Such text may be existing documentation that was meant to accompany a call to process "Present.templates( )" Similarly, the text associated with "<Action_attribute2>" may be specifically associated with its corresponding value of call to process "Save.file( )" and includes "the current claim application being saved." Such text may be existing documentation that was meant to accompany a call to process "Save.file( )" Even if the definition of the File menu were to change (e.g., such as at user interface 700 of FIG. 7), documentation 900 may be updated to be populated with the changed value(s) of the definition. Thus, the documentation that is tailored to the user configured application may always be current with the most up to date of the application.

FIGS. 10, 11, 12, and 13 illustrate an example of generating documentation for a search feature of an application.

Figure 10:
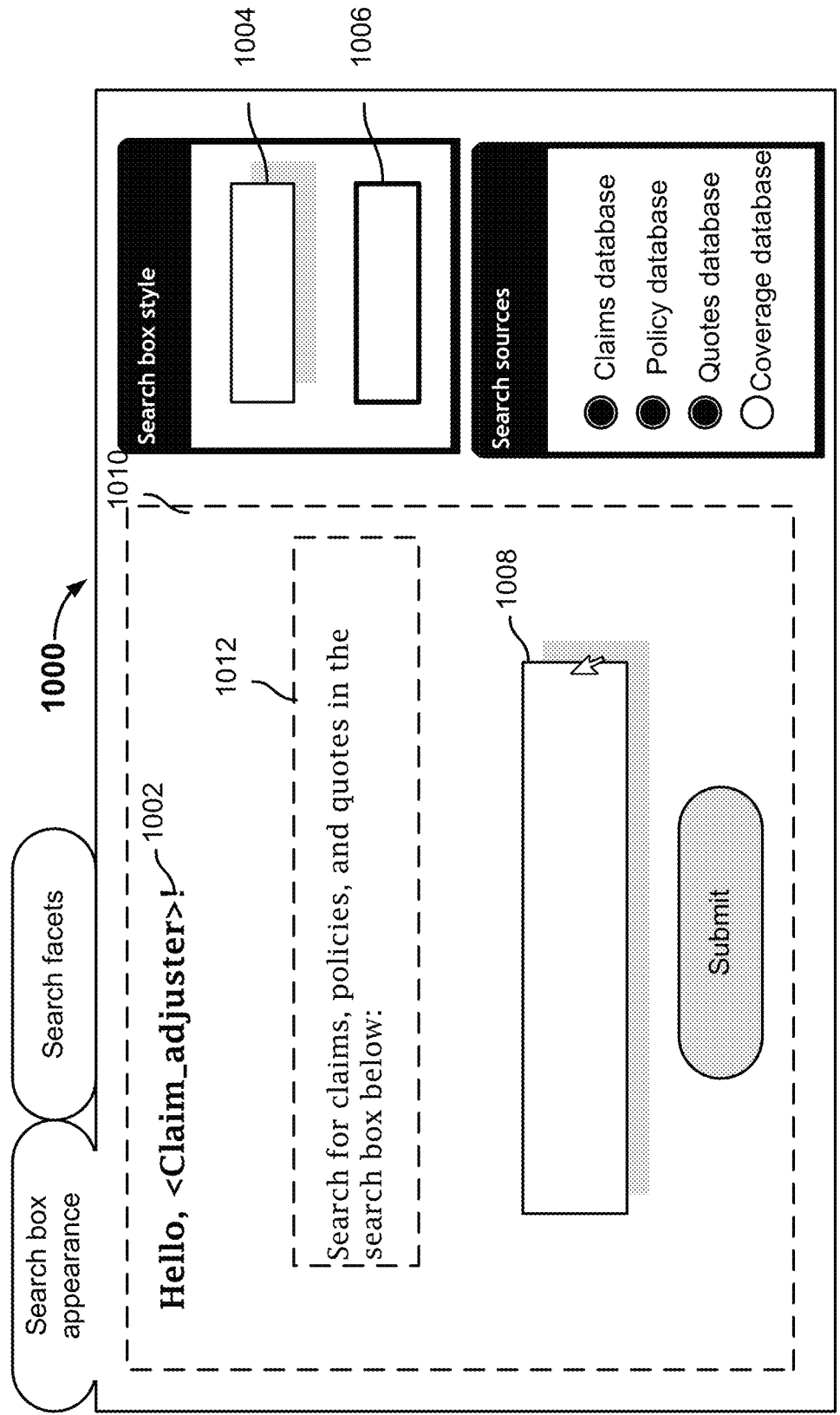
FIG. 10 is a diagram showing an example of a user interface associated with a developer tool used to define applications.

FIG. 10 is a diagram showing an example of a user interface associated with a developer tool used to define applications. The example of FIG. 10 describes an example of a definition for a portion of a search feature for an application that is intended for the use of a claims adjuster in performing customer service tasks. For example, the enterprise associated with the application may be an insurance company. In the example, developer tool user interface 1000 of the "Search box appearance box" tab shows a user interface used to define a search box for an application. User interface 1000 enables a developer user to customize certain aspects of a search box of an application. For example, area 1010 of user interface 1000 shows what a user that uses the deployed application will see when they are using the search feature. Area 1010 shows text 1002 including "Hello, <Claim_ajduster>!", where "<Claim_ajduster>" references an identification (e.g., name) of the claim adjuster user that will view the search feature of the deployed application. Area 1012 comprises an editable text box in which the developer has input the text "Search for claims, policies, and quotes in the search box below:". In user interface 1000, the developer may select between one of two possible appearances of the search box, search box 1004 and search box 1006, and drag the icon of either search box 1004 and search box 1006 from the "Search box style" menu onto area 1010 to select the desired appearance. In the example, the developer user has already dragged the icon associated with search box 1004 into area 1010 to create search box 1008. Also, the developer may select one or more search sources from the "Search sources." The selected data sources are sources that will be searched for a query submitted through search box 1008 of the deployed application. In the example, three databases (the "Claims database," the "Policy database," and the "Quotes database") of the possible search sources are selected.

FIG. 11 is a diagram showing an example of a user interface associated with a developer tool used to define applications. The example of FIG. 11 describes an example of a definition for another portion of the search feature for an application that is intended for the use of a claims adjuster in performing customer service tasks. In the example, developer tool user interface 1100 of the "Search facets" tab shows a user interface used to define facets for the search feature that was partially defined using user interface 1000 of FIG. 10. Facets of a search feature may include enumerated keywords or phrases that a user may select to narrow down the list of search results. For example, for a set of search results, if a user selects the facet associated with the keyword "medical," then the narrowed set of search results would only include search results that were associated with the term "medical" and those search results that were not associated with the term "medical" would not appear in the narrowed results set.

In the example, the left column titled "Context attribute" includes various enumerated attributes to use as facets for the search feature. The first column is populated with attributes that correspond to the selections that are checked in their corresponding checkboxes within the "Context attributes from the selected data sources" menu. The selections available in the "Context attributes from the selected data sources" menu (e.g., "Policy identity," "Claim filer identity," "Claim adjuster identity," "Vehicle insurance," "Home insurance," "Medical insurance," "Dental insurance," and "Eye insurance") are associated with the search sources that were selected in the "Search sources" menu from user interface 1000 of FIG. 10 (the "Claims database," the "Policy database," and the "Quotes database"). The right column titled "Context attributes value" includes the context attributes' corresponding values (e.g., labels for the attributes) that are input into each row by the developer. The developer may input a customized label or name that he desires to use to refer to each selected context attribute. For example, for the context attribute of "<Policyholder_identity>", the developer input the value of "Policyholder name" so that the facet associated with "<Policyholder_identity>" will be referred to the "Policyholder name" facet in the search feature of the application.

FIG. 12 is an example of a template to be used with meta information associated with an application in generating documentation for the application. The example of FIG. 12 describes an example of a search topic template that may be used with the search feature defined in FIGS. 10 and 11. In some embodiments, the meta definition describing the definition of the search feature defined in FIGS. 10 and 11 includes XML files from which one or more DITA topics may be selected. In the example, the definition of the search feature defined in FIGS. 10 and 11 is associated with a DITA topic that is associated with the subject of search. In generating documentation for the application, the meta information describing the definition of the search feature defined in FIGS. 10 and 11 may be parsed and the DITA topic associated with the search feature may be extracted. Then, a transformation process or publishing mechanism (e.g., associated with documentation generation engine 210 of FIG. 2) may use search topic template 1200 of FIG. 12 to transform the DITA topic associated with the search feature defined in FIGS. 10 and 11 into documentation for how to use the search feature.

Search topic template 1200 includes content that will be displayed as is in the resulting documentation. For example, the text of "A search may be performed on the following sources," "After entering your search query in the displayed search box, select the 'Submit' button to submit your query," "Shortly after submitting your search query, you will be presented with a list of search results found from the selected search sources," and "To refine your search, select one or more of the following facets on the search results page" may appear as is in the resulting documentation. Search topic template 1200 also includes content that references elements of the definition of the search feature defined in FIGS. 10 and 11 described by the associated meta information. For example, "<source1>", "<source2>", "<source3>", "<source4>", "<selected_context_attribute1>", "<selected_context_attribute3>", "<selected_context_attribute3>", "<selected_context_attribute4>", and "<selected_context_attribute5>" reference the elements of the search feature defined in the FIGS. 10 and 11.

For example, references to elements of the definition may be treated differently in the resulting documentation based on one or more of the following: a tag that may be associated with the element in the definition, logic/computer code associated with the template that has awareness of the different manners in which different types of elements are to be handled, and logic/computer code associated with generation of the documentation (e.g., documentation generation engine 210 of FIG. 2) that has awareness of the different manners in which different types of elements are to be handled. For example, the attributes associated with search sources, such as "<source1>", may indicate the number of data sources that were selected in the definition of the application and so even though search topic template 1200 may include references for up to four search sources ("<source1>", "<source2>", "<source3>", and "<source4>"), only three values corresponding to the three search sources that were selected in the definition of the search feature in FIG. 10 (the "Claims database," the "Policy database," and the "Quotes database") would be included in the resulting documentation. Also for example, the attributes associated with the selected facets, such as "<selected_context_attribute1>", may indicate the number of context attributes that were selected in the definition of the search feature in FIG. 11 and so even though search topic template 1200 may include references for up to the maximum number of context attributes, only the values corresponding to the five selected context attributes that were input in the definition of the search feature in FIG. 11 ("Policyholder name," "Claimant name," "Claim adjuster name," "Car insurance," and "Home insurance") would be included in the resulting documentation.

FIG. 13 is an example of a portion of documentation generated for an application. The example of FIG. 12 describes an example of some of the portion of documentation generated for the search feature defined in FIGS. 10 and 11 for an application. In the example, documentation 1300 is generated using the meta information associated with the definition of the search feature in FIGS. 10 and 11 and the search topic template 1200 of FIG. 12. Documentation 1300 comprises a human-readable document and may be displayed in any of various formats, such as, a Word Document, and a PDF, a (e.g., HTML) webpage, for example. Documentation 1300 (along with other documentation) may be sent to claim adjusters that are employees of the insurance company associated with the application to guide them on using the application. Documentation 1300 specifically provides some guidance for using the search feature associated with the application.

Documentation 1300 includes identification of the three selected search sources populated from the definition of the search feature in FIG. 10 (the identification of such search sources include "Claims database," the "Policy database," and the "Quotes database"), the values corresponding to the selected context attributes that are populated from the definition of the search feature in FIG. 11 (these values include "Claims database," "Policy database," "Quotes database," "Policyholder name," "Claimant name," and "Claim adjuster name," "Car insurance," and "Home insurance"), and text from search topic template 1200 of FIG. 12 (this type of text includes "A search may be performed on the following sources," "After entering your search query in the displayed search box, select the 'Submit' button to submit your query," "Shortly after submitting your search query, you will be presented with a list of search results found from the selected search sources," and "To refine your search, select one or more of the following facets on the search results page"). Even if the definition of the search feature were to change (e.g., such as at user interface 1000 of FIG. 10 and/or user interface 1100 of FIG. 11), documentation 1300 may be updated to be populated with the changed value(s) of the definition.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising: a developer tool including a memory and one or more processors configured to:

identify at least one relationship between two or more application components, the at least one relationship including one or more functional interactions between the application components;

define the at least one relationship using at least a management system (MS) blueprint;

using a graphical tool, compose an application using the two or more application components with component attributes and communication integrations with one or more third-party application programming interfaces (APIs) in response to an input;

identify any changes in the functional interaction between the two or more application components;

identify one or more executable instructions corresponding to the two or more application components based on their respective structures, wherein identifying the executable instructions includes generating a set of Darwin information typing architecture topics categorized as concepts, procedures, or reference topics by parsing an extensible markup language of each component;

tag the one or more executable instructions corresponding to the two or more application components, the changes in functional interactions, and changes to the component attributes;

in response to a change to an aspect of the application, including the two or more application components, establishing a searchable data structure including a technical mapping that identifies function changes of the application;

generating a human-readable document that includes information corresponding to the application's use, definition, and deployment thereof, wherein generating the human-readable document includes mapping meta information to relevant document locations, wherein the meta-information includes the technical mapping and the application's structure and content elements.

* * * * *